(12) United States Patent
Thumm

(10) Patent No.: US 12,466,511 B2
(45) Date of Patent: Nov. 11, 2025

(54) STEERING STOP FOR BICYCLE HANDLEBARS

(71) Applicant: Canyon Bicycles GmbH, Koblenz (DE)

(72) Inventor: Johannes Thumm, Koblenz (DE)

(73) Assignee: Canyon Bicycles GmbH, Koblenz (DE)

( * ) Notice: Subject to any disclaimer, the term of this patent is extended or adjusted under 35 U.S.C. 154(b) by 492 days.

(21) Appl. No.: 17/988,190

(22) Filed: Nov. 16, 2022

(65) Prior Publication Data

US 2023/0150606 A1 May 18, 2023

(30) Foreign Application Priority Data

Nov. 17, 2021 (DE) ..................... 20 2021 106 265.7

(51) Int. Cl.
*B62K 21/06* (2006.01)
*B62K 21/10* (2006.01)

(52) U.S. Cl.
CPC .............. *B62K 21/06* (2013.01); *B62K 21/10* (2013.01)

(58) Field of Classification Search
CPC ................................ B62K 21/06; B62K 21/10
USPC ....................................................... 280/279
See application file for complete search history.

(56) References Cited

U.S. PATENT DOCUMENTS

| | | | | |
|---|---|---|---|---|
| 4,887,827 A * | 12/1989 | Heggie | .................. | B62K 21/00 403/375 |
| 6,003,890 A * | 12/1999 | Inouye | .................. | B62K 21/00 280/270 |
| 9,174,695 B1 * | 11/2015 | Wang | .................... | F16C 19/163 |
| 9,475,539 B2 * | 10/2016 | Ehrhard | ................ | B62K 21/00 |
| 10,138,933 B2 * | 11/2018 | Breitfeld | ................ | F16C 25/06 |
| 10,293,879 B1 | 5/2019 | Killing et al. | | |
| 11,794,847 B2 * | 10/2023 | Juban | ..................... | B62K 21/12 |
| 11,981,390 B2 * | 5/2024 | Breitfeld | ................ | F16C 35/06 |
| 12,258,089 B2 * | 3/2025 | Tsai | ......................... | B62J 45/41 |
| 2007/0108723 A1 * | 5/2007 | Fukui | ..................... | B62K 19/32 280/276 |
| 2012/0063712 A1 * | 3/2012 | Hsieh | ..................... | B62K 21/06 384/548 |
| 2013/0009379 A1 * | 1/2013 | Matthews | .............. | B62K 19/32 280/279 |
| 2014/0084563 A1 * | 3/2014 | Ehrhard | ................. | B62K 21/00 280/270 |
| 2020/0361559 A1 | 11/2020 | Wen | | |
| 2022/0204118 A1 * | 6/2022 | King | ....................... | B62K 21/06 |
| 2023/0074447 A1 | 3/2023 | Mcdonald et al. | | |

(Continued)

FOREIGN PATENT DOCUMENTS

| | | | | |
|---|---|---|---|---|
| DE | 202012008119 U1 * | 1/2014 | ............ | B62K 21/00 |
| DE | 102018006153 A1 | 2/2020 | | |

(Continued)

*Primary Examiner* — James A Shriver, II
(74) *Attorney, Agent, or Firm* — The Webb Law Firm

(57) ABSTRACT

A steering stop for bicycle handlebars includes a first stop element. The stop element can be connected to a steer tube of a bicycle fork in particular in a clamping manner and includes two stops. A second stop element can be fixed on the bicycle frame and cooperates with the first stop element. For passing lines therethrough, which originate for example at a brake and/or gearshift unit, the first stop element includes at least one recess.

19 Claims, 3 Drawing Sheets

(56) References Cited

U.S. PATENT DOCUMENTS

| | | | | |
|---|---|---|---|---|
| 2023/0150606 A1* | 5/2023 | Thumm | ................ | B62K 21/10 |
| | | | | 280/279 |
| 2023/0406437 A1* | 12/2023 | Thumm | ................ | B62K 21/10 |
| 2024/0425134 A1* | 12/2024 | Gu | ........................ | B62K 21/06 |

FOREIGN PATENT DOCUMENTS

| DE | 202021106265 U1 * | 4/2023 | ............. B62J 11/10 |
|---|---|---|---|
| DE | 202022103224 U1 * | 10/2023 | ............. B62K 19/32 |
| DE | 202022103131 U1 * | 11/2023 | ............. B62K 19/32 |
| EP | 1787899 A1 | 5/2007 | |

* cited by examiner

STEERING STOP FOR BICYCLE HANDLEBARS

CROSS-REFERENCE TO RELATED APPLICATION

This claims priority to German Patent Application No. 20 2021 106 265.7 filed Nov. 17, 2021, the disclosure of which is hereby incorporated by reference in its entirety.

BACKGROUND OF THE DISCLOSURE

Field of the Disclosure

The disclosure relates to a steering stop for bicycle handlebars.

Description of Related Art

For example in the event of a fall or if a bicycle falls over, there is a risk of the top tube being damaged, in particular by components mounted to the handlebar, such as brake and/or shift handles. Such damage must be avoided, in particular with bicycle frames made of fiber-reinforced plastics, such as carbon, since this may possibly even cause a destruction of the bicycle frame.

From DE 20 2012 008 119.5 a steering stop is known which comprises a first stop element adapted to be clamped to the steer tube of a bicycle tube. A second stop element, which serves to limit a steering lock, cooperates with the first stop element. The second stop element is attached to an upper side of the top tube by two screws. Such a steering stop may be well suited for mountain bikes and trekking bikes, however, it is not well suited for cockpits with an integrated design, such as provided especially for racing bikes, triathlon bikes and the like.

SUMMARY OF THE DISCLOSURE

It is an object of the disclosure to provide a steering stop that is also suited in particular for cockpits with an integrated design.

According to the disclosure, the object is achieved with a steering stop with the features as described herein.

The steering stop for bicycle handlebar according to the disclosure comprises a first stop element which can be fixed to the steer tube of a bicycle fork. This first stop element has two stops. A left and a right steering lock are limited by means of these two stops. Further, a second stop element is provided that can be fixed to the bicycle frame and cooperates with the first stop element. According to the disclosure, the first stop element is configured such that at least one recess is provided for passing lines therethrough. The lines are cables, Bowden cables and the like Using the steering stop according to the disclosure, it is thus possible to insert lines into the interior of the steer tube or to insert them laterally beside the steer tube into the head tube of the bicycle frame and then to guide them through the bicycle frame, for example to an electrical or mechanical gearshift. It is thus possible, on the one hand, to provide a steering stop in order to prevent damage to the bicycle frame, in particular to the top tube, in the event of a fall or the like, and, on the other hand, to design an integrated cockpit.

Preferably, the first stop element is designed to be annular in shape and preferably surrounds the steer tube completely. It is particularly preferred that the in particular annular first stop element can be fixed to the steer tube by means of a clamping element. In a particularly preferred embodiment this is realized by the first stop element being annular in shape and having a slot. Using a clamping element, in particular in the form of a screw, a clamped fixing of the first stop element to the steer tube can be realized in a simple manner.

It is particularly preferred that the two stops of the first stop element comprise stop surfaces. In the event of an extreme right or left steering lock of the handlebar, these surfaces come into contact with the second stop element at the respective limit angles. The two stop surfaces preferably have an angle of less than 300° with respect to each other. Specifically, the angle is smaller than 250° and, as is particularly preferred, smaller than 180°. Due to the stop element, which also has a certain width, the maximum possible steering angle is reduced by 10° to 20°, for example. Thus, the handlebar can be turned by 70° to 100° with respect to the traveling direction, before the left or right stop surface comes to contact second stop element.

Furthermore, it is preferred that the first stop element serves as a cover element, in particular a cover ring, in particular for the upper headset bearing. The in particular annular first stop element thus comprises an additional protective function, in particular against contamination, for the upper headset bearing.

It is preferred that the at least one recess for the passage of lines is provided on a side of the stop surface opposite or directed away from the stop surface. When providing two stop surfaces and at least two recesses, it is preferred that at least one of the recesses per stop is arranged on the side directed away from or opposite to the stop surface, respectively. This is the side that faces in the traveling direction in the mounted state.

The at least one recess is preferably configured such that it is open to the outside. In a preferred embodiment, this is not a passage opening, but a recess or an indentation. Here, it is relevant that the at least one recess is configured such in the mounted state of the first stop element that lines can be inserted into the head tube of the bicycle frame through the recess. Thus, it is possible in a simple manner to insert, for example, lines from a brake and/or shift lever unit laterally on the first stop element in the region of the recess into the frame, in particular the head tube of the frame. The preferred embodiment of the at least one recess as a recess or indentation or the like that is open to the outside has the further advantage that the corresponding element can be replaced in a simple manner without having to first open lines and pull them through the corresponding recess. Moreover, it is possible to mount the stem significantly lower, since the lines passed through the at least one open recess can be guided forward rather than upward. This has the further advantage that lines need not be passed through a spacer or distance element. As such, an independent assembly and disassembly of spacers is possible.

The second stop element can be fixed to the bicycle frame. Preferably, a fixing is made in the area of the top tube of the bicycle frame. Here, it is possible to arrange the second stop element on an upper side of the top tube. However, since this causes dirt deposits in this area and may possibly also cause injuries, it is preferred in a particularly preferred embodiment, to arrange the second stop element in the bicycle frame, in particular the top tube of the bicycle frame. The second stop element is thus essentially invisible from outside. In the mounted state, it is preferred in this respect that the second stop element is arranged below an upper side of the top tube. Correspondingly, also the arrangement of the first stop element is preferably such that it is arranged below the upper side of the top tube. Providing the second stop element in, in particular inside, the bicycle frame, in particular the top tube, is a disclosure independent of the provision of at least one recess for passing lines therethrough, with the combination of both disclosures, however, representing an advantageous development.

Preferably, the top tube has a recess in which the second stop element is arranged. In particular, the second stop element can be inserted into this recess. The fixing can be effected using corresponding fixing means, locking elements or also in a clamping manner, in particular solely due to form fit. The recess, in which the second stop element is arranged, is preferably open in the direction of the steer tube of the frame.

It is particularly preferred that the second stop element comprises a retaining element which serves for connection to the bicycle frame, in particular for insertion into the recess. Furthermore, in a preferred development, the second stop element comprises a stop. The stop is preferably connected to the retaining element via a connecting web. Here, it is particularly preferred that this connecting web is formed as a rated breaking point. This has the advantage that, when large forces occur, damage to the bicycle frame in the area of the arrangement of the retaining element is avoided, since the stop breaks off from the retaining element. This absorbs a large amount of energy, so that the risk of damage to the top tube by components fastened to the handlebar is further reduced.

It is a particular advantage of the design of the second stop element according to the disclosure that the same can be replaced in a simple manner, if necessary. It is possible to design the second stop element as a plug-on or screw-on stop element. In particular, a disassembly of further components, for example a bearing shell or the like, is not necessary. The design of the second stop element, in particular as an element independent of a bearing shell, has the further advantage that a bearing shell can be omitted and the bearing seat can be integrated directly in the frame.

In a further preferred embodiment of the disclosure, an in particular annular cover element is provided on an upper side of the first stop element. It is particularly preferred to cover the recesses using this cover element in order to prevent the intrusion of water and dirt. Therefore, it is preferred that the cover element has a passage opening through which the lines can be passed towards the at least one recess in the first stop element. Preferably, the at least one passage opening of the cover element is closed by a closure element. The same preferably surrounds the lines guided therethrough in a substantially sealing manner. It is particularly preferred that the closure element is made of an elastic plastic material such as a rubber and comprises at least one slot for passing lines therethrough. In particular, a cross-shaped slot is provided.

If the first stop element is fixed in a clamping manner to the steer tube via a clamping element, such as a screw, it is further preferred that the cover element has a further passage opening in the area of the clamping element so as to be able to introduce the corresponding tool such as an Allen key. Preferably, this passage opening is also closed by a closure element which, in a preferred embodiment, is designed analogous to the closure elements of the other passage openings.

Preferably, the cover element is positively connected with the first stop element. Thereby, the cover element is prevented from being twisted with respect to the first stop element. A further fixation in the mounted state is effected, for example, through the handlebar stem which is connected with the steer tube above the cover element.

Since it is particularly preferred that the first stop element is clampingly connected with the steer tube, it is possible to maintain a pretension to be applied to the headset bearings. Thus, for assembly, the two headset bearings are first pretensioned against each other and the first stop element is then fixed to the steer tube in a clamping manner. This has the advantage that, for example for transport purposes, the stem can be detached from the steer tube together with the handlebar without the need to adjust the pretension of the headset bearings during reassembly.

Further, the disclosure relates to a bicycle frame which in particular comprises a top tube and a head tube connected with the top tube. Further, the bicycle frame comprises a fork, the steer tube of which is arranged in the head tube. The bicycle frame is provided with an above-described handlebar stop in a preferred development. In particular, the top tube comprises a recess in which a retaining element of the second stop element is arranged, in particular insertable.

BRIEF DESCRIPTION OF THE DRAWINGS

In the following, the disclosure is described in more detail by means of a preferred embodiment with reference to the accompanying drawings. In the drawings.

DESCRIPTION OF THE DISCLOSURE

Figure 1:
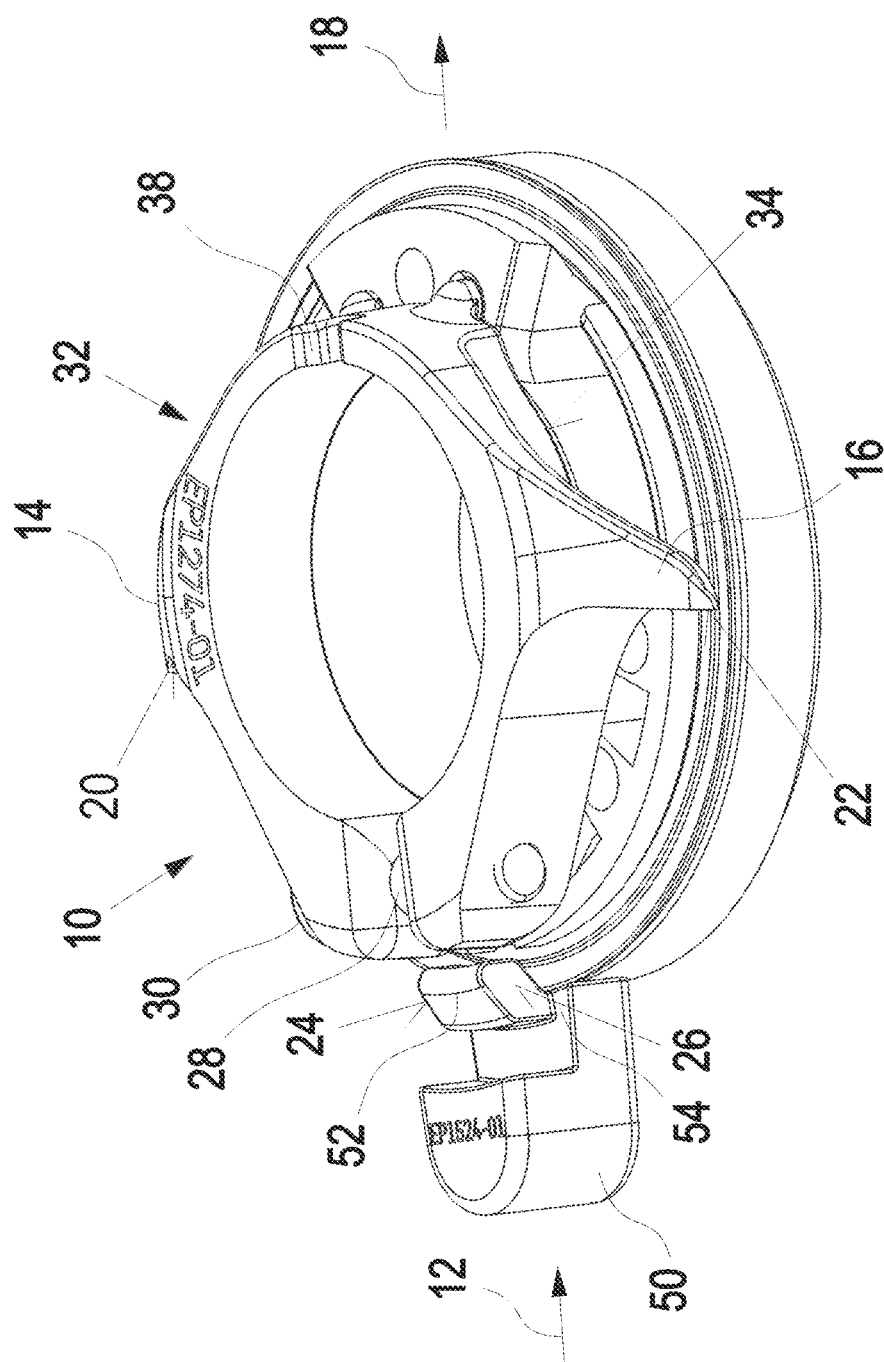
FIG. 1 shows a schematic perspective view of the two stop elements.

The steering stop comprises a first stop element 10, as well as a second stop element 12 cooperating therewith. The first stop element 10, which in particular is designed to be annular in shape, comprises two mutually opposite stop elements 14, 16. Each stop element 14, 16 has a stop surface 20, 22 on the rear side facing in the direction opposite to the direction of travel 18. When the handlebar is turned left in the traveling direction, the steering angle is limited by the fact that the stop surface 20 abuts against a stop surface 24 of the second stop element 12, which is the left stop surface in the traveling direction. Analogously, the stop surface 22 of the stop 16 abuts against the right stop surface 26 in the case of an extreme right steering angle.

In the preferred embodiment illustrated, the first stop element 10 is clampingly fixed to a steer tube not illustrated. To this end, the first stop element has a slot 28, the slot width and thus the inner diameter of the first stop element being adapted to be reduced using a clamping element such as a clamping screw 30.

According to the disclosure, in the embodiment illustrated, the first stop element comprises two recesses 32, 34. These recesses are arranged on the opposite side of the stop surfaces 20, 22 of the stops 14, 16, respectively. In other words, the two recesses 32, 34 are arranged in front of the stops 14, 16 with respect to the traveling direction 18. As such, it is possible to insert lines into the frame in this area, in particular into the head tube of the frame.

Figure 2:
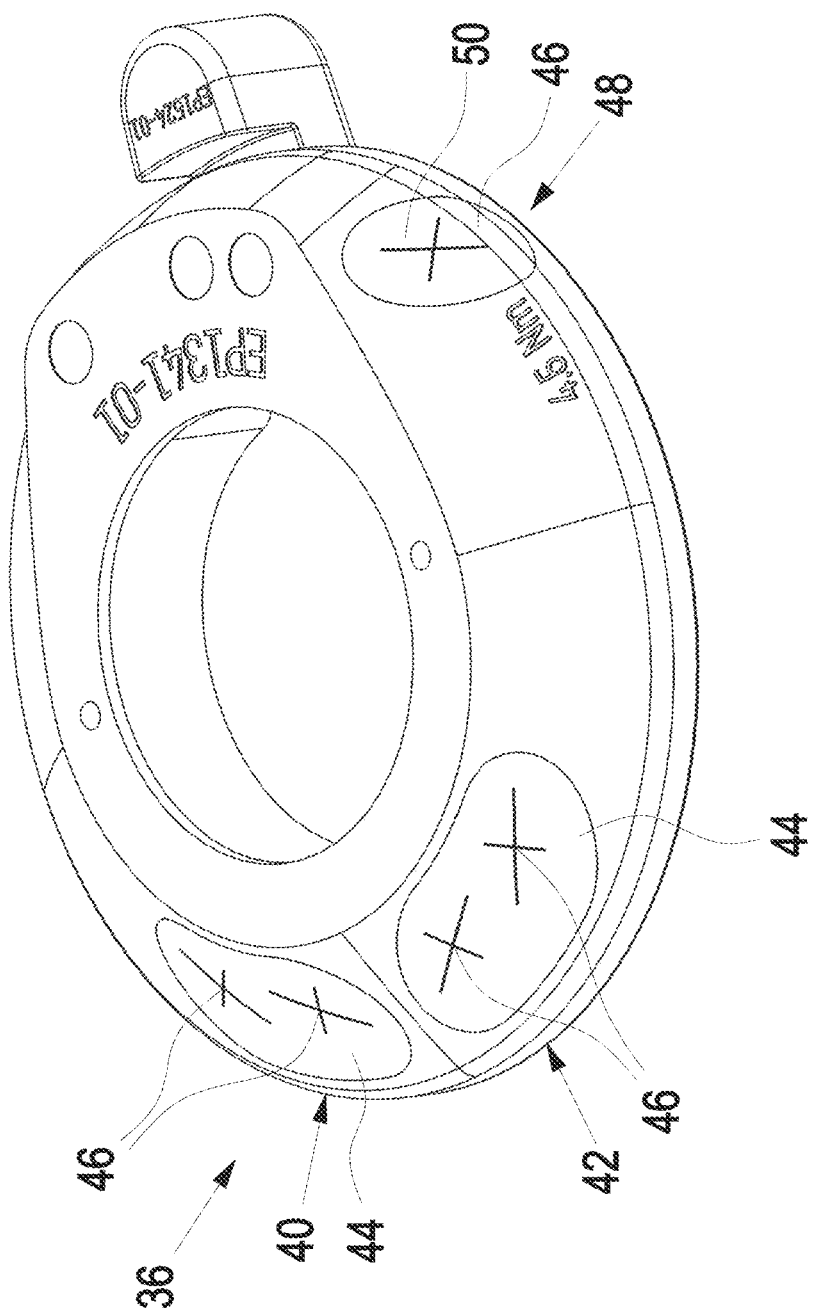
FIG. 2 shows a schematic perspective top plan view on the cover element.

For covering, the first stop element 10 is a cover element 36 (FIG. 2) which is preferably also formed to be annular in shape. The cover element 36 has a nose directed downward and not visible in the Figure, which nose engages in a recess 38 (FIG. 1) of the first stop element, so that a twisting of the cover element 16 is prevented.

The cover element has passage openings 40, 42 in the area of the recesses 32, 34. Both passage openings are closed by a closure element 44, respectively, each closure element 44 comprising two cross-shaped slots for passing lines, cables, and the like therethrough, so that these can be passed through in a sealed manner.

In the mounted state, the passage opening 42 is arranged above the recess 32 and the passage opening 44 is arranged above the recess 34.

Furthermore, the cover element 36 has a passage opening 48 which is also closed by a closure element 50 with slots 46. The passage opening 46 serves for passing a tool therethrough and, in the mounted state, is arranged at the level of the screw 30.

In operation, the steering force of the first stop element 10 on the steer tube is set such that, when one of the two stops 14, 16 strikes, initially the first stop element twists on the steer tube. The first stop element can be turned back and be clamped again in a simple manner by loosening the screw 30.

The second stop element comprises a retaining element 50, as well as a stop 52. The stop 52 forms the opposing stop surfaces 24, 26. The stop 52 is connected to the retaining element 50 via a connecting web 54. Here, the connecting web 54 serves as a rated breaking point. If, for example, the first stop element is not twisted on the steer tube because of excessive clamping forces or, for example, because of contamination, the connecting web will break, so as to prevent excessive force from being introduced into the bicycle frame via the retaining element 50.

In the mounted state (FIG. 3), a head tube 56 of the bicycle frame is connected to or formed integrally with a top tube 58. The steer tube of the bicycle fork is arranged in the head tube 56 and is rotatably supported by an upper headset bearing 60 and a lower headset bearing which is not illustrated. In the embodiment illustrated, a respective compression ring 62 is provided for fixing the headset bearings 60. The same preferably also has line passages, provided that the compression ring 62 is also arranged in the area of the recesses 32, 34. After the pretensioning of the two headset bearings 60, the first stop element 10 is clampingly fixed, so that the pretension of the headset bearings is maintained, regardless of whether the stem is mounted or dismounted.

The retaining element 50 of the second stop element 12 is inserted into a recess 64, which is provided on a side of the top tube 58 facing in the direction of the head tube 56. In the embodiment illustrated, fixing is effected by the upper headset bearing 60.

Since the retaining element 50 is arranged in the recess 54 provided in the top tube 58, the same is not visible.

Figure 3:
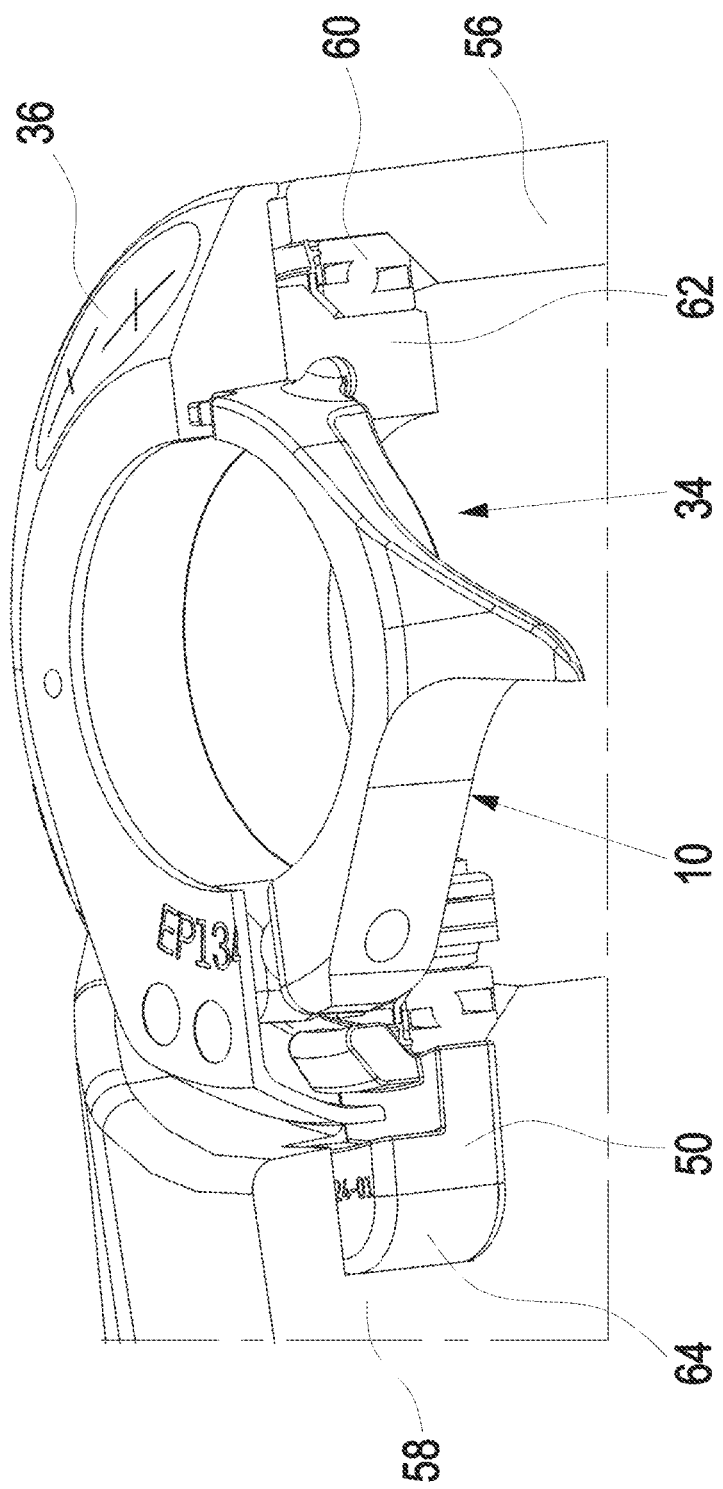
FIG. 3 shows a partly sectional view of the entire steering stop in the mounted state.

Then, the cover element 36 (FIG. 2), which is illustrated only schematically in FIG. 3, is arranged above the first stop element 10.

The invention claimed is:

1. A steering stop for bicycle handlebars comprising;
    a first stop element with two stops, wherein the first stop element is adapted to be fixed on the steer tube of a bicycle fork; and
    a second stop element adapted to be fixed on the bicycle frame and cooperating with the first stop element, wherein the first stop element has at least one recess for passing lines therethrough, and wherein second stop element is adapted to be arranged in a recess in the bicycle frame.

2. The steering stop for bicycle handlebars according to claim 1, wherein the first stop element is annular in shape.

3. The steering stop for bicycle handlebars according to claim 1, wherein stop surfaces of the first stop element have an angle of less than 300° with respect to each other.

4. The steering stop for bicycle handlebars according to claim 1, wherein the first stop element serves as a cover and/or a fixing element of an upper headset bearing.

5. The steering stop for bicycle handlebars according to claim 1, wherein the stops have stop surfaces for limiting a left or right steering lock.

6. The steering stop for bicycle handlebars according to claim 5, wherein one of the at least one recesses is provided on a side of the stop opposite the respective stop surface.

7. The steering stop for bicycle handlebars according to claim 1, wherein the recess for the second stop element is located in a top tube of the bicycle frame.

8. The steering stop for bicycle handlebars according to claim 1, wherein the second stop element comprises a retaining element adapted for insertion into the recess, and a stop connected to the retaining element.

9. The steering stop for bicycle handlebars according to claim 8, wherein a connecting web is formed between the retaining element and the stop element as a rated breaking point.

10. The steering stop for bicycle handlebars according to claim 1, wherein an annularly shaped cover element is provided at an upper side of the first stop element, and wherein the cover element covers the at least one recess.

11. The steering stop for bicycle handlebars according to claim 10, wherein in an area of the at least one recess, the cover element has a passage opening adapted to be closed by a closure element.

12. The steering stop for bicycle handlebars according to claim 11, wherein the closure element is made of an elastic plastic material with a slot for passing lines therethrough.

13. The steering stop for bicycle handlebars according to claim 10, wherein in an area of a clamping element of the first stop element, the cover element has a passage opening closed in particular by a closure element.

14. The steering stop for bicycle handlebars according to claim 10, wherein the cover element is positively connected to the first stop element.

15. A bicycle frame with a top tube and a head tube connected to the top tube, the bicycle frame comprising a steering stop according to claim 1.

16. The steering stop for bicycle handlebars according to claim 2, wherein the first stop element further comprises a clamping element for a clamping fixation on the steer tube.

17. The steering stop for bicycle handlebars according to claim 1, wherein stop surfaces of the first stop element have an angle of less than 250° with respect to each other.

18. The steering stop for bicycle handlebars according to claim 1, wherein stop surfaces of the first stop element have an angle of less than 180° with respect to each other.

19. The steering stop for bicycle handlebars according to claim 7, wherein the recess for the second stop element is arranged on a front side of the top tube facing in a direction of a head tube and is open only towards the head tube.

* * * * *